(12) United States Patent
Tominaga

(10) Patent No.: US 7,773,977 B2
(45) Date of Patent: Aug. 10, 2010

(54) DATA-SHARING SYSTEM AND DATA-SHARING METHOD

(75) Inventor: Hirohisa Tominaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1132 days.

(21) Appl. No.: 11/381,256

(22) Filed: May 2, 2006

(65) Prior Publication Data

US 2006/0264239 A1 Nov. 23, 2006

(30) Foreign Application Priority Data

May 17, 2005 (JP) ............................. 2005-143584

(51) Int. Cl.
*H04M 3/42* (2006.01)
(52) U.S. Cl. .................. 455/416; 370/260; 379/205.01; 709/204
(58) Field of Classification Search ................. 455/416, 455/558, 395; 370/260; 379/205.01, 202.01; 709/204

See application file for complete search history.

(56) References Cited

U.S. PATENT DOCUMENTS

| | | | | |
|---|---|---|---|---|
| 6,457,062 | B1 * | 9/2002 | Pivowar et al. | 709/248 |
| 6,654,032 | B1 * | 11/2003 | Zhu et al. | 715/753 |
| 6,910,188 | B2 * | 6/2005 | Keohane et al. | 715/751 |
| 7,202,783 | B2 * | 4/2007 | Want et al. | 340/568.1 |
| 7,206,806 | B2 * | 4/2007 | Pineau | 709/203 |
| 2002/0073204 | A1 * | 6/2002 | Dutta et al. | 709/227 |
| 2003/0135576 | A1 * | 7/2003 | Bodin | 709/213 |

OTHER PUBLICATIONS

A. S. Tanenbaum, "Modern Operating Systems, The base and application of OS, From design to implementation, From DOS to distributed OS Amoeba", Japan, Toppan Co., Ltd., First Edition, Nov. 30, 1995, (and Prentice-Hall, Inc., 1992), pp. 221-223, 675-678.

* cited by examiner

*Primary Examiner*—Nay A Maung
*Assistant Examiner*—Angelica M Perez
(74) *Attorney, Agent, or Firm*—Oblon, Spivak, McClelland, Maier & Neustadt, L.L.P.

(57) ABSTRACT

A method for sharing a data file among devices is provided, wherein the data file corresponding to a first data file stored in any of information-processing devices is transmitted to a file server, when a mobile terminal controlling a data-file-sharing operation requests registration of the first data file, as an object to be used by the other device. The data file is stored in a management region. The file server transmits file-sharing information including location information and attribute information of the data file. The file-sharing information is transmitted from the information-processing device to the mobile terminal which selects a second data file for reception on the basis of the attribute information, accesses the file server on the basis of the location information corresponding to the second data file, and requests transmission of the second data file so that the second data file is transmitted.

11 Claims, 6 Drawing Sheets

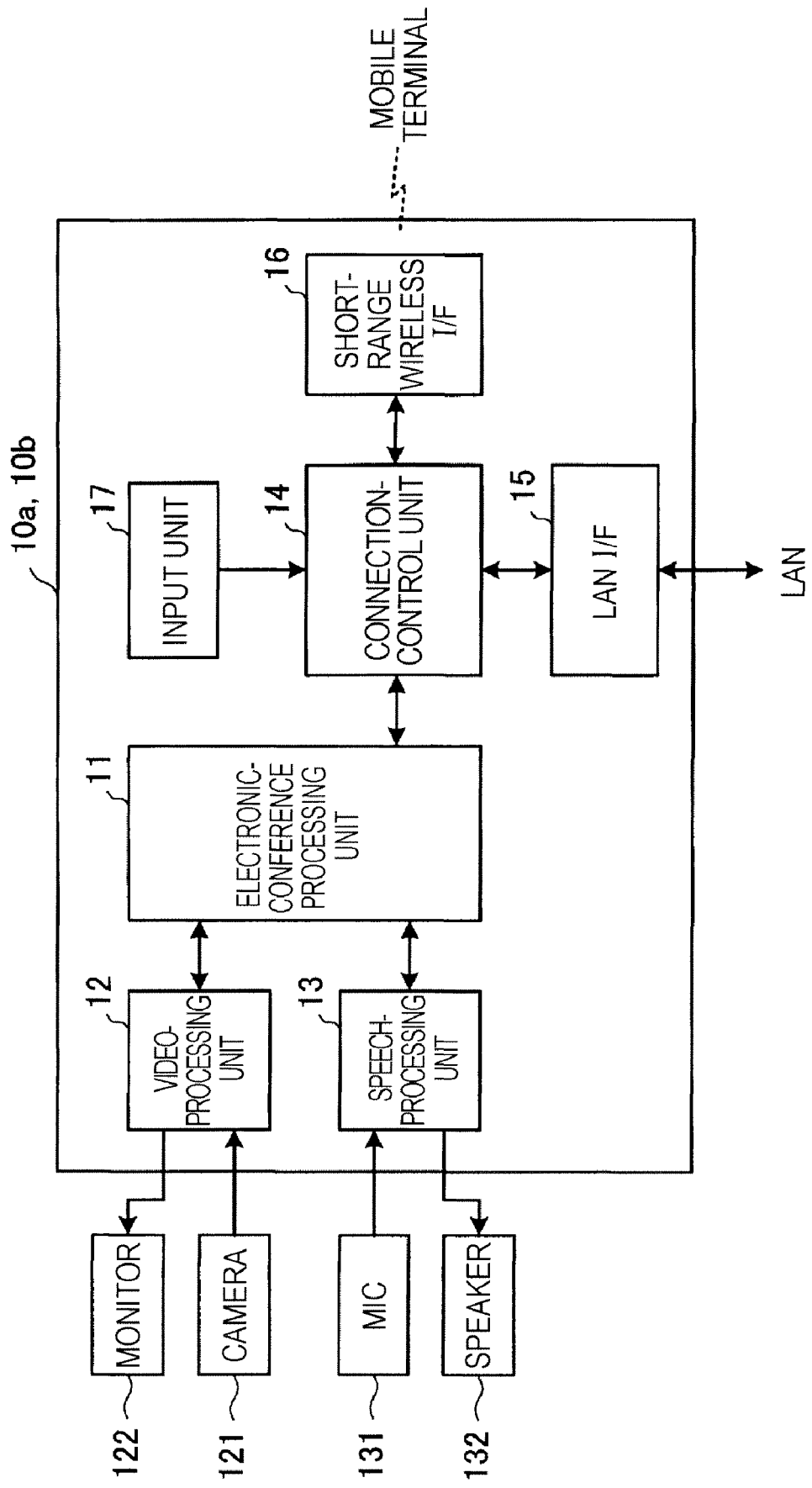

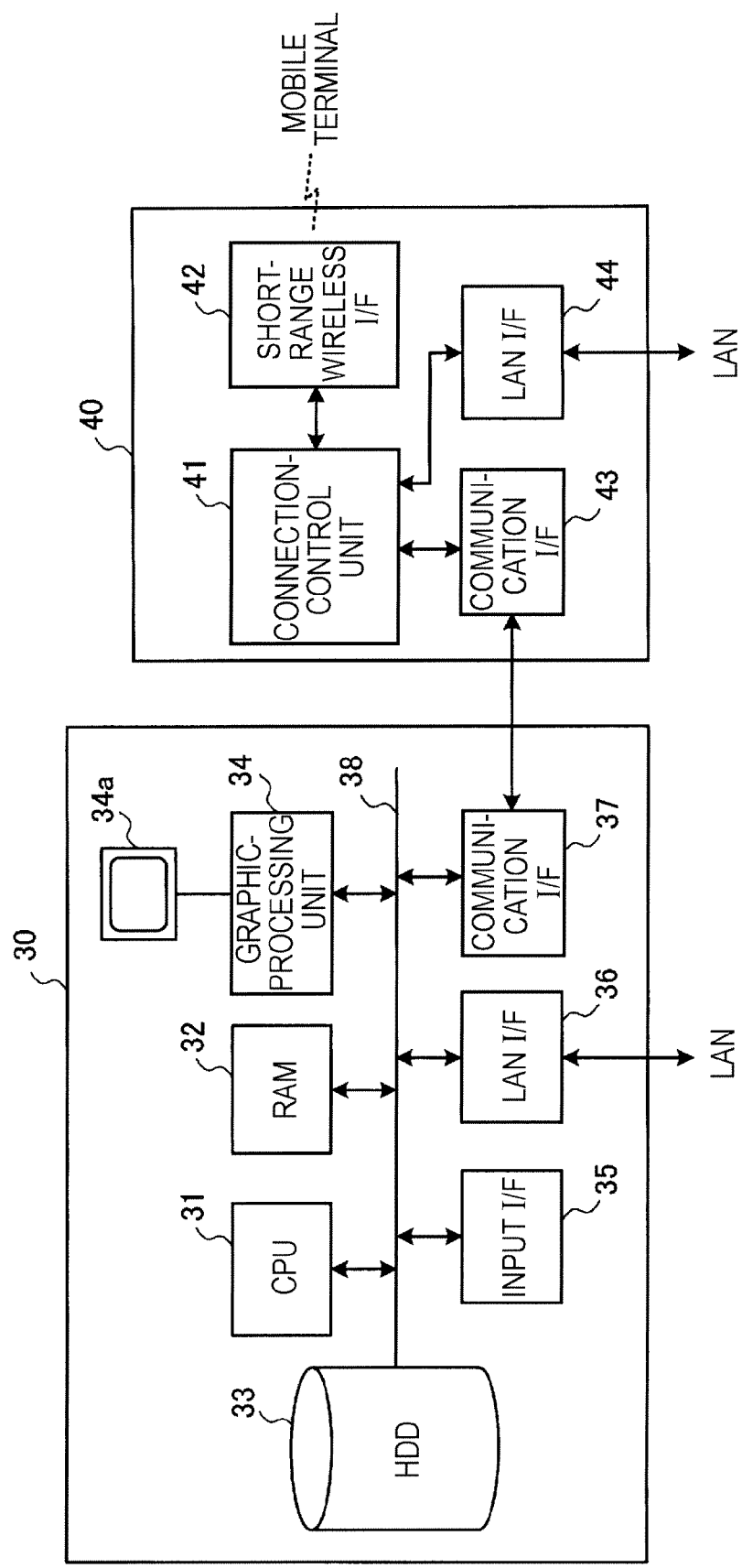

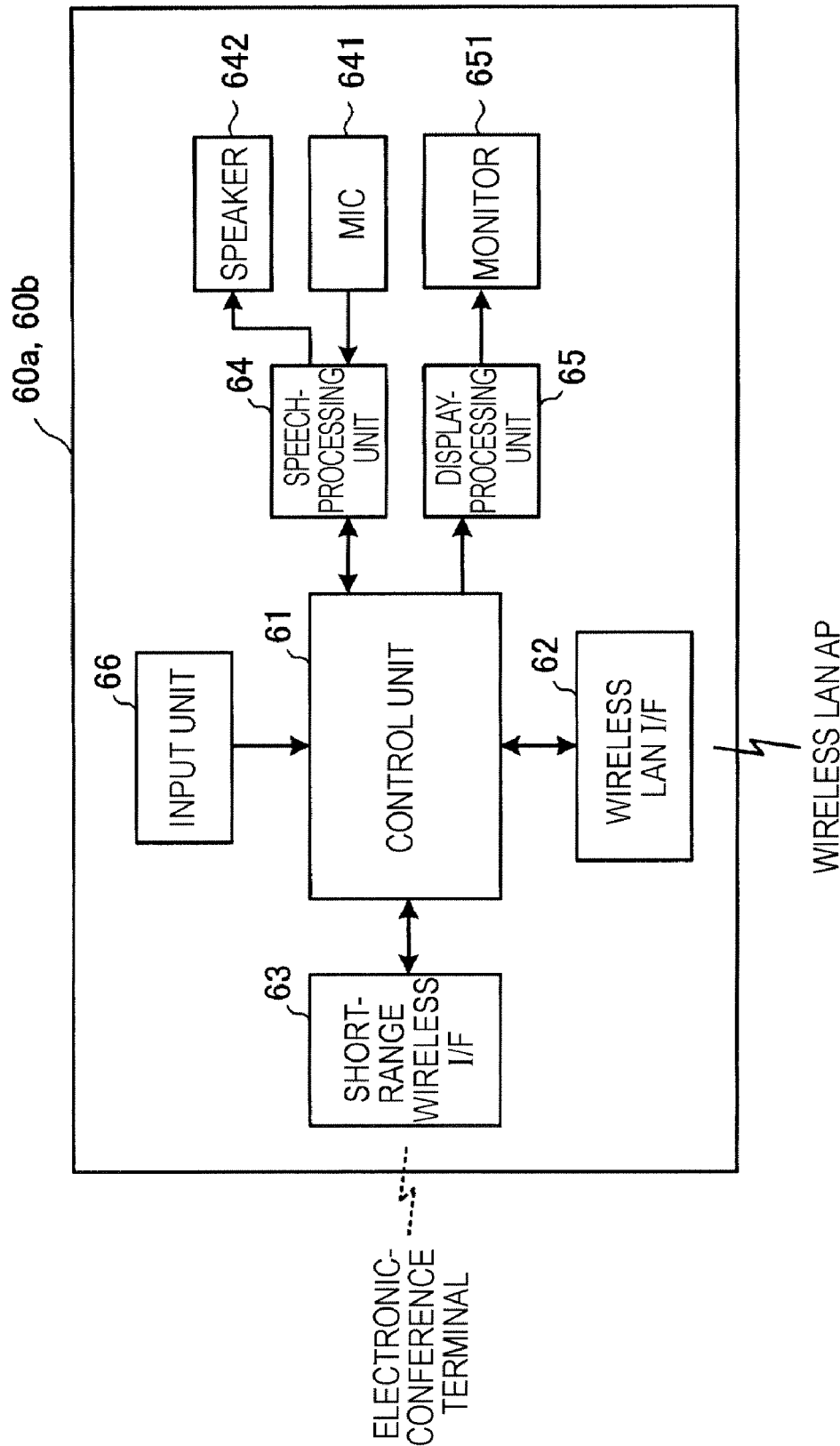

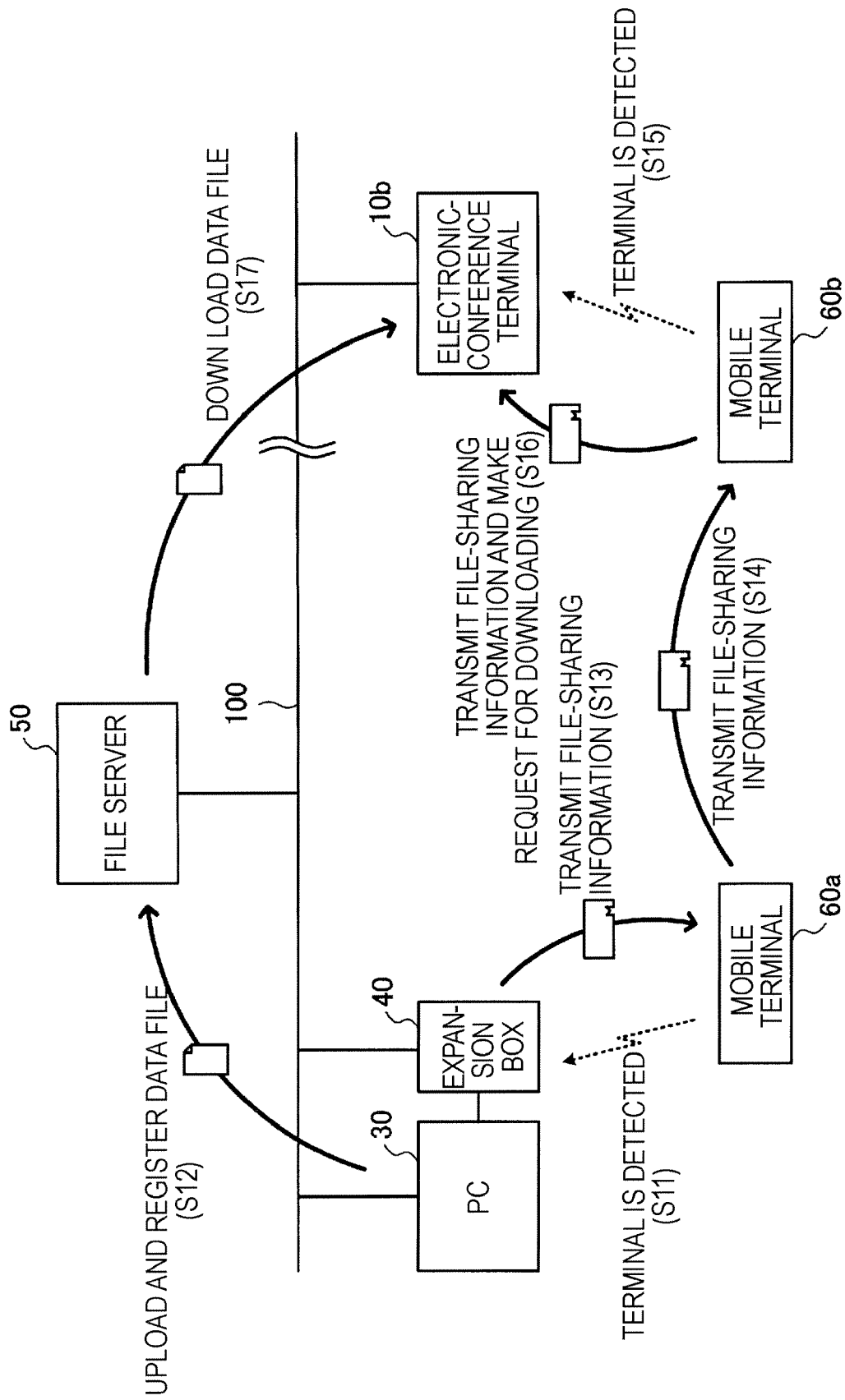

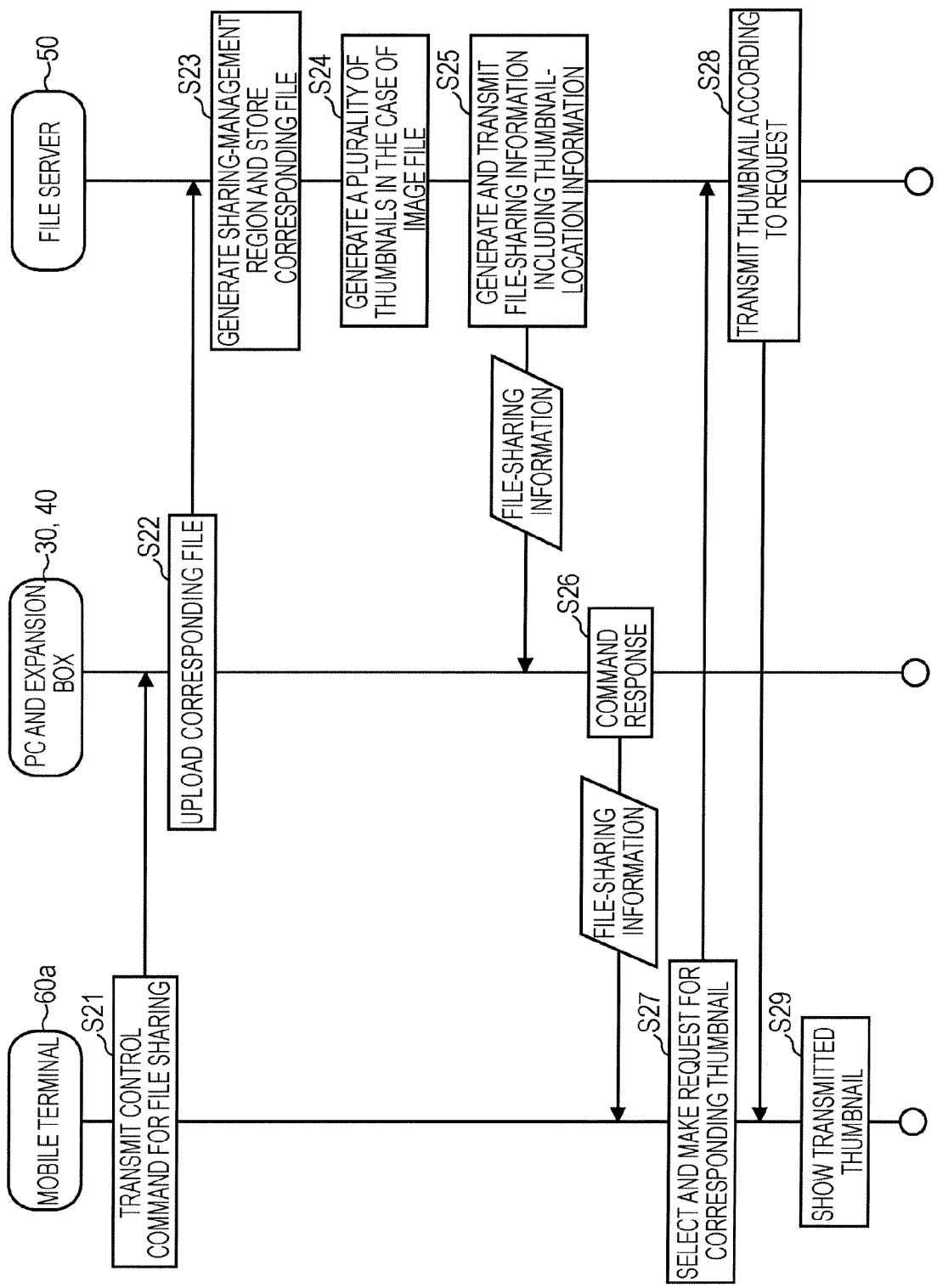

DATA-SHARING SYSTEM AND DATA-SHARING METHOD

CROSS REFERENCES TO RELATED APPLICATIONS

The present invention contains subject matter related to Japanese Patent Application JP 2005-143584 filed in the Japanese Patent Office on May 17, 2005, the entire contents of which are incorporated herein by reference.

BACKGROUND OF THE INVENTION

1. Field of the Invention

The present invention relates to a data-sharing system and a data-sharing method that are adapted to share a data file among a plurality of devices.

2. Description of the Related Art

In recent years, the advance of the communication technologies has been significant. For example, communications services including electronic-mail systems achieved on the basis of the Internet Protocol (IP) network and mobile phones achieved on wireless-communication systems have become indispensable for ordinary users for their daily life and business. Further, services including IP-telephone systems, IP-mobile-phone systems, and so forth that are achieved by using the IP network, as the conversation line, and technologies adapted to establish a TV-phone system and hold a TV conference have become also available.

Further, systems for sharing a data file among devices connected to one another via a network, as is the case with the above-described examples, have been discussed. For example, data-file transmission-and-reception systems configured to share a data file accumulated on a file server among at least two devices have been proposed. An example of the above-described data-file transmission-and-reception systems is disclosed in Japanese Unexamined Patent Application Publication No. 2002-351731 (paragraphs [0023] to [0036] and FIG. 5). According to the above-described example, data transfer is performed between a client terminal and a File-Transfer-Protocol (FTP) server by using a program running on a Web server, the program relating to Hypertext Transfer Protocol (HTTP). Subsequently, even though the client terminal does not include an FTP client software program, a data file can be transmitted and/or received between the client terminal and the FTP server by performing a drag-and-drop operation through the client terminal.

SUMMARY OF THE INVENTION

In the past, for sharing a data file among devices via a network, operations including transmitting information about the path of the data file on a network and/or a file server had to be performed on the reception-device side. Particularly, when the data file is shared among remote places, as is the case with an electronic conference, it is troublesome to inform a conferee on the other end of the electronic conference of the path information. Therefore, a highly-operable system which can transmit and/or receive the data file without worrying about the location of the data file has been demanded.

Accordingly, there is a need for a data-sharing system which can be easily operated, so as to share a data file among a plurality of devices. Further, there is a need for a data-sharing method adapted to share the data file among the plurality of devices with increased operability.

According to an embodiment of the present invention, therefore, a data-sharing system configured to share a data file among a plurality of devices includes a plurality of information-processing devices which can store at least one data file, a file server which manages at least one of the data files, the at least one data file being shared, and a mobile terminal which controls an operation performed, so as to share the at least one data file stored in each of the information-processing devices. The file server includes a file-management unit configured to receive and store at least one of the at least one data file stored in any of the information-processing devices, when it is requested that the data file for the reception and storing be registered, as an object to be used by the other information-processing device, a shared-information transmission unit configured to transmit file-sharing information including location information and attribute information of the at least one data file stored in the file-management unit, and a first file-transmission unit configured to return the data file corresponding to the data file stored in the file-management unit upon receiving an instruction to select the data file stored in the file-management unit. Each of the information-processing devices includes a second file-transmission unit which transmits the at least one data file stored in the information-processing device to the file server upon receiving request information transmitted from the mobile terminal, the request information indicates that it is requested that the at least one data file stored in the information-processing device be registered, as the object to be used by the other information-processing device, and a shared-information transfer unit which transfers the file-sharing information to the mobile terminal, the file-sharing information being transmitted from the file server after the second file-transmission unit transmits the data file to the file server. The mobile terminal includes a registration-request unit which makes a request of any of the information-processing devices to register a predetermined data file of the at least one data file stored in the information-processing device, as the object to be used by the other information-processing device, and a transmission-request unit configured to select the data file to be received on the basis of the attribute information included in the file-sharing information transmitted from the information-processing device, access the file server on the basis of the location information corresponding to the selected data file, and make a request of the file server to transmit the selected data file.

In the above-described data-sharing system, the registration-request unit of the mobile terminal makes a request of any of the information-processing devices to register the predetermined data file stored in the information-processing device, as the object data file. In the information-processing device which had received the request, the second file-transmission unit transmits the corresponding data file to the file server. In the file server, the transmitted data file is stored in the file-management unit and the shared-information-transmission unit transmits the file-sharing information to the information-processing device which is the transmission source of the data file, the file-sharing information including the location information and attribute information of the at least one data file stored in the file-management unit. In the information-processing device, the shared-information transfer unit transfers the file-sharing information transmitted from the file server to the mobile terminal.

In the mobile terminal, the transmission-request unit selects the data file for reception on the basis of the attribute information included in the transferred file-sharing information, accesses the file server on the basis of the location information corresponding to the selected data file, and makes the request of the file server to transmit the data file. In the file server, the first file-transmission unit transmits the selected data file for which the transmission request is made to the mobile terminal. Subsequently, the selected data file can be transmitted to the mobile terminal and used, so as to confirm the contents thereof, for example.

In the above-described data-sharing system, a data file stored in any of the information-processing devices is stored in the file-management unit of the file server and registered, as the object data file to be used by the other device, and the file-sharing information corresponding to the registered data file is transmitted to the mobile terminal according to the request made by the mobile terminal. The file-sharing information includes the location information of the object data file and the mobile terminal and/or the other device can access the data file according to the location information. Subsequently, the data file stored in the information-processing device can be shared by performing simple operations by using the mobile terminal. Further, the file-sharing information includes the attribute information of the at least one data file stored in the file-management unit of the file server so that the mobile terminal can select and receive an adequate data file according to the attribute information. That is to say, the mobile terminal can receive a data file suitable therefor and use the data file, so as to confirm the contents thereof, for example. Subsequently, the operability for sharing the data file is increased.

BRIEF DESCRIPTION OF THE DRAWINGS

FIG. 2 is a block diagram showing the configuration of an electronic-conference terminal;

FIG. 3 is a block diagram showing the configuration of each of a personal computer (PC) and an expansion box;

FIG. 4 is a block diagram showing the configuration of a mobile terminal;

FIG. 5 schematically shows the entire operations performed for sharing a data file; and FIG. 6 shows the sequence of processing procedures performed for making the data file sharable.

DESCRIPTION OF THE PREFERRED EMBODIMENTS

Figure 1:
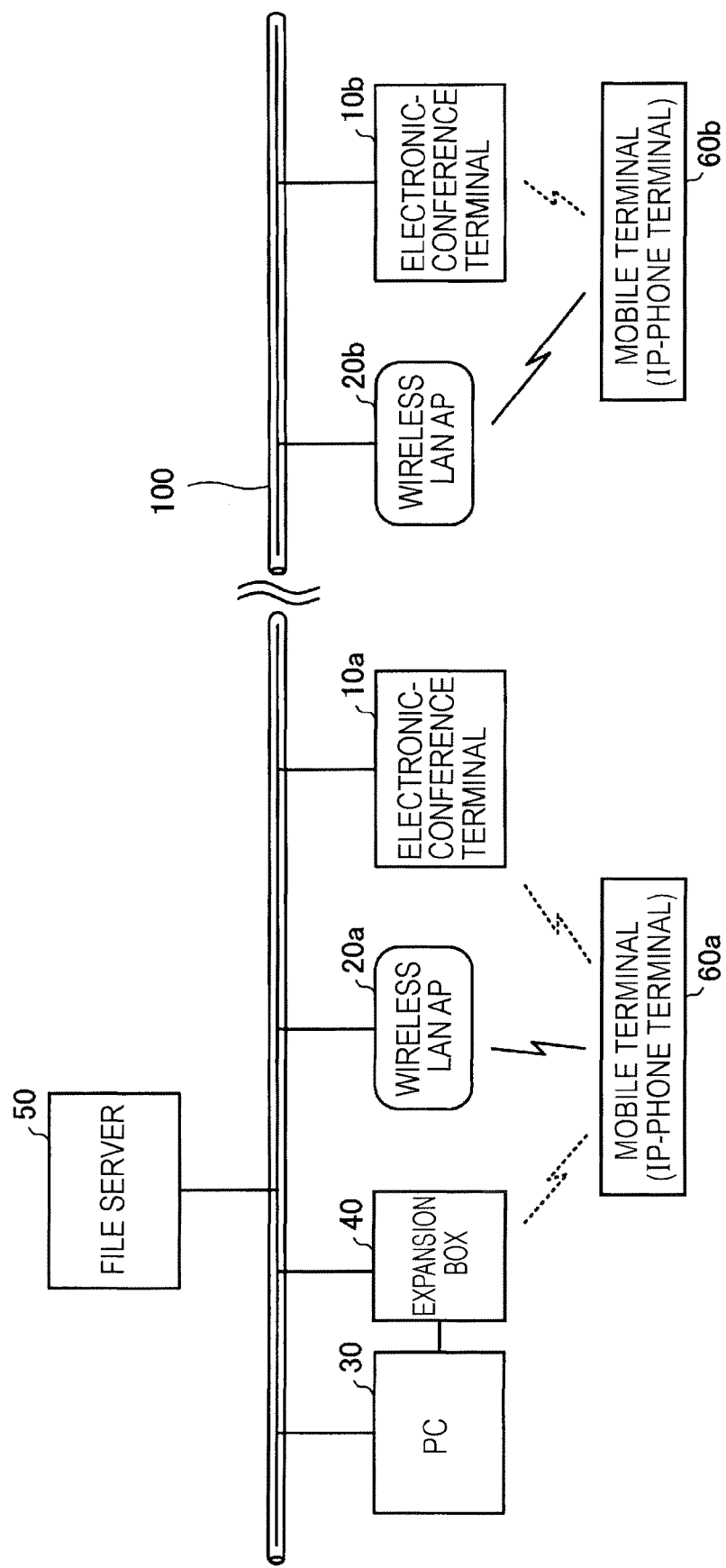
FIG. 1 shows an example configuration of a communication system according to an embodiment of the present invention.

Hereinafter, embodiments of the present invention will be described in detail with reference to the attached drawings. FIG. 1 shows an example configuration of a communication system according to an embodiment of the present invention. The communication system includes electronic-conference terminals 10a and 10b, wireless local-area-network (LAN) access points (AP) 20a and 20b, a personal computer (PC) 30 and the expansion box 40 thereof, and a file server 50 that are connected to one another via a LAN (including a wide-area network (WAN) to which the LAN is connected) 100. Further, mobile terminals 60a and 60b can be connected to the LAN 100 wirelessly via the wireless-LAN access point 20a.

The electronic-conference terminals 10a and 10b are provided in remote conference rooms, respectively, so as to hold an electronic conference, and configured to transmit and/or receive a video signal and an audio signal to/from each other via the LAN 100. Further, each of the electronic-conference terminals 10a and 10b includes a wireless-communication interface configured to perform communications according to a short-range wireless communication scheme. Subsequently, the electronic-conference terminals 10a and 10b can communicate with the mobile terminals 60a and 60b in a non-contact manner.

The wireless-LAN access points 20a and 20b are connected to the LAN 100 by using cables and function, as master units so that wireless-LAN devices (the mobile terminals 60a and 60b in this embodiment) are connected to the line (the cables) wirelessly. Further, the wireless-LAN access points 20a and 20b may have various security functions required when data is transmitted and/or received by radio communications.

In this embodiment, the PC 30 holds various data files including still-image data, text data, drawing data, and so forth. The expansion box 40 is connected to the LAN 100 by using a cable and configured to communicate with the mobile terminals 60a and 60b according to the short-range wireless communication scheme. As will be discussed later, the expansion box 40 is connected to the PC 30 according to a predetermined communication scheme, and has the function of using the data files stored in the PC 30 by another device according to a control command transmitted from the mobile terminal 60a and/or the mobile terminal 60b. That is to say, the expansion box 40 has the function of sharing the data files among other devices.

The file server 50 is configured to manage the data files shared among the devices connected to the LAN 100. The data files that can be shared among the devices are stored in the file server 50, as will be described later.

The mobile terminals 60a and 60b are provided, as slave units connected to the LAN 100 via the wireless-LAN access points 20a and 20b. When connected to the LAN 100, the mobile terminals 60a and 60b function, as call terminals included in Internet-protocol (IP) telephone service performed on the basis of voice over Internet protocol (VoIP). Further, each of the mobile terminals 60a and 60b includes a communication interface used for performing communications according to the short-range wireless communication scheme so that the mobile terminals 60a and 60b can communicate with the electronic-conference terminals 10a and 10b, and the expansion box 40 in a non-contact manner according to the short-range wireless communication scheme.

According to the short-range wireless communication system, users of the electronic-conference terminals 10a and 10b have the mobile terminals 60a and 60b, respectively, so that the users can have conversations with each other by using the IP telephone via the mobile terminals 60a and 60b. Further, the mobile terminals 60a and 60b can communicate with the electronic-conference terminals 10a and 10b on the basis of the short-range wireless communication scheme, respectively. When an application used for holding the electronic conference is executed, the electronic-conference terminals 10a and 10b detect the mobile terminals 60a and 60b by performing short-range wireless communications. When the mobile terminals 60a and 60b are authenticated, the electronic-conference terminals 10a and 10b can transmit and/or receive information to/from the mobile terminals 60a and 60b by performing the short-range wireless communications. After that, the electronic-conference terminals 10a and 10b can be connected to the mobile terminals 60a and 60b via the LAN 100 and can operate according to control commands transmitted from the mobile terminals 60a and 60b.

Further, when the mobile terminals 60a and 60b are detected and authenticated by the expansion box 40 according to the short-range wireless communication scheme, the data files stored in the PC 30 can be shared among the devices connected to the LAN 100 by operating the mobile terminals 60a and 60b. For example, when the image data stored in the PC 30 becomes necessary while an electronic conference is held, it becomes possible to transfer the corresponding data file stored in the PC 30 to the electronic-conference terminal 10a and/or the electronic-conference terminal 10b by operating the mobile terminal 60a. At that time, the corresponding data file, that is, the data file which is made sharable is managed by the file server 50 and transferred from the file server 50 to another device.

FIG. 2 is a block diagram showing the configuration of each of the electronic-conference terminals 10a and 10b. The electronic-conference terminals 10a and 10b are configured in the same way and include an electronic-conference-processing unit 11, a video-processing unit 12, a speech-processing unit 13, a connection-control unit 14, a LAN interface 15, a short-range wireless interface (I/F) 16, and an input unit 17.

The electronic-conference processing unit 11 performs processing adapted to achieve an electronic conference. More specifically, the electronic-conference processing unit 11 performs basic processing necessary for enjoying the electronic-conference service, where the basic processing includes steps of making settings on connection to a terminal on the other end of the electronic conference, making settings on the imaging-and-recording function, making settings on video-and-speech-signal outputs, and so forth. Further, the electronic-conference processing unit 11 performs processing for inputting and/or outputting the image signal and the speech signal. Namely, the electronic-conference processing unit 11 outputs the video signal transmitted from the video-processing unit 12 and the speech signal transmitted from the speech-processing unit 13 to the connection-control unit 14 and/or the LAN interface 15. Further, the electronic-conference processing unit 11 outputs the video signal and the speech signal transmitted thereto via the LAN interface 15 and/or the connection-control unit 14 to the video-processing unit 12 and the speech-processing unit 13, respectively, for example. Further, the electronic-conference processing unit 11 can reproduce image data or the like held in the shared data file and make a monitor 122 produce the reproduced image.

The video-processing unit 12 converts a video signal into a digital signal, the video signal being transmitted from a camera 121 externally connected to the electronic-conference terminal, encodes the digital signal into a signal in a predetermined format, and outputs the encoded signal to the electronic-conference processing unit 11. Further, the video-processing unit 12 decodes and converts the video signal transmitted from the electronic-conference processing unit 11 into an analog signal, outputs the analog signal to the monitor 122 externally connected to the electronic-conference terminal, and makes the monitor 122 produce an image of the analog signal. The speech-processing unit 13 converts a speech signal into a digital signal, the speech signal being transmitted from a microphone 131 externally connected to the electronic-conference terminal, encodes the digital signal into a signal in a predetermined format, and outputs the encoded signal to the electronic-conference processing unit 11. Further, the speech-processing unit 13 decodes and converts the video signal transmitted from the electronic-conference processing unit 11 into an analog signal, outputs the analog signal to a speaker 132 externally connected to the electronic-conference terminal, and makes the speaker 132 reproduce speech of the analog signal.

The connection-control unit 14 performs processing adapted to make operations of the electronic-conference processing unit 11 controllable by using the mobile terminal 60a and/or the mobile terminal 60b detected by the short-range wireless interface 16. For example, the connection-control unit 14 controls connection to somebody on the other end in the electronic conference according to a signal transmitted from the input unit 17, and/or a control command transmitted from, for example, the mobile terminal 60a and/or the mobile terminal 60b via the short-range wireless interface 16 and/or the LAN interface 15. Further, the connection-control unit 14 performs control over transferring a video signal and a speech signal between the electronic-conference processing unit 11 and the LAN interface 15, control for receiving a shared data file via the LAN interface 15 and making the electronic-conference processing unit 11 reproduce and output an image of the shared data file, and so forth. Further, the connection-control unit 14 performs processing adapted to authenticate the mobile terminal 60a and/or the mobile terminal 60b detected by the short-range wireless interface 16, device-management processing, and so forth.

The LAN interface 15 is connected to the LAN 100 and controls transmission and/or reception of a signal between the line between the LAN interface 15 and he LAN 100, and the connection-control unit 14. The short-range wireless interface 16 is used for communicating with the mobile terminal 60a and/or the mobile terminal 60b according to the short-range wireless communication scheme. In the above-described embodiment, an electromagnetic-induction communication scheme using a wireless-IC chip is used, as the short-range wireless communication scheme. Further, the short-range wireless interface 16 includes a reader-and-writer configured to apply power to the wireless IC chip provided in each of the mobile terminals 60a and 60b, and transmit and/or receive a signal to/from the wireless IC chip. The input unit 17 includes an input key or the like, so as to output the control signal corresponding to an operation performed by the user to the connection-control unit 14.

Further, the function adapted to control the electronic-conference processing by using the mobile terminal 60a and/or the mobile terminal 60b may be provided, as a device separate from the electronic-conference terminal, as is the case with the expansion box 40 which will be described later. In that case, for example, the electronic-conference terminal includes an interface to the LAN 100, communicates with the terminal on the other end under the control of the electronic-conference terminal, so as to transmit and/or receive image data and speech data to/from the other-end terminal. Further, the connection-control unit 14, the short-range wireless interface 16, etc. shown in FIG. 2 are provided, as external expansion devices, for example. When the expansion devices are connected to the electronic-conference terminal by using a communication medium such as predetermined serial communications, communications performed between the electronic-conference terminals via the LAN 100 are performed via the expansion devices. Further, the electronic-conference terminals, and the mobile terminals 60a and 60b can be used, as control terminals of the electronic conference.

FIG. 3 is a block diagram showing the configuration of each of the PC 30 and the expansion box 40. As shown in the drawing, the PC 30 includes a central-processing unit (CPU) 31, a random-access memory (RAM) 32, a hard-disk drive (HDD) 33, a graphic-processing unit 34, an input interface 35, a LAN interface 36, and a communication interface 37 that are connected to one another via a bus 38.

The CPU 31 controls the entire PC 30. The RAM 32 temporarily stores at least one part of a program executed by the CPU 31 and/or various data items necessary for processing performed by the program. The HDD 33 stores an operating system (OS), an application program, and various data items.

A monitor 34a is connected to the graphic-processing unit 34 which makes the monitor 34a produce an image on the screen of the monitor 34a according to an instruction transmitted from the CPU 31. A keyboard and a mouse (not shown) are connected to the input interface 35 which transmits signals transmitted from the keyboard and/or the mouse to the CPU 31 via the bus 38. The LAN interface 36 transmits and/or receives data to/from other devices via the LAN 100. The communication interface 37 is provided, as a serial-communication interface, and transmits and/or receives data to/from the expansion box 40.

Further, the file server 50 can have the same configuration as that of the PC 30 (except for the communication interface 37). Further, the expansion box 40 is provided, as an expansion device configured to perform processing adapted to make the data files stored in the PC 30 sharable among other devices. The expansion box 40 includes a connection-control unit 41, a short-range wireless interface 42, a communication interface 43, and a LAN interface 44, as shown in FIG. 3.

The connection-control unit 41 receives a control command transmitted from the mobile terminal 60a and/or the mobile terminal 60b detected by the short-range wireless interface 42 via the LAN interface 44 or the short-range wireless interface 42, controls the PC 30 according to the control command via the communication interface 43, and makes the data files stored in the PC 30 sharable. Further, the connection-control unit 41 performs processing adapted to authenticate the mobile terminal 60a and/or the mobile terminal 60b detected by the short-range wireless interface 42, device-management processing, and so forth.

The short-range wireless interface 42 is configured to communicate with the mobile terminal 60a and/or the mobile terminal 60b according to the short-range wireless communication scheme. Here, the short-range wireless interface 42 includes a reader-and-writer configured to apply power to the wireless IC chip provided in each of the mobile terminals 60a and 60b, and transmit and/or receive a signal to/from the wireless IC chip. The communication interface 43 is provided, as a serial-communication interface configured to communicate with the PC 30, for example. The LAN interface 44 transmits and/or receives data to/from other devices via the LAN 100.

Here, the function of the above-described expansion box 40 may be provided in the PC 30. For example, only the short-range wireless interface 42 may be provided, as an external device, and connected to the PC 30 via the serial-communication interface.

FIG. 4 is a block diagram showing the configuration of either of the mobile terminals 60a and 60b. The mobile terminals 60a and 60b are configured in the same way so that each of the mobile terminals 60a and 60b includes a control unit 61, a wireless-LAN interface 62, a short-range wireless interface 63, a speech-processing unit 64, a display-processing unit 65, an input unit 66, a microphone 641, a speaker 642, and a monitor 651.

The control unit 61 includes a CPU and a memory storing a program executed by the CPU, various data items, and so forth, for example. The control unit 61 is configured to control each of blocks of the mobile terminals 60a and 60b in a centralized manner. More specifically, the control unit 61 performs call processing for the IP telephone via the wireless-LAN interface 62. Namely, the control unit 61 outputs a speech signal transmitted from the speech-processing unit 64 to the wireless-LAN interface 62 and outputs the speech signal transmitted via the wireless-LAN interface 62 to the speech-processing unit 64. Further, the control unit 61 transmits and/or receives various data items including address information, a control command, and so forth via the wireless-LAN interface 62 and/or the short-range wireless interface 63, generates display information used for the monitor 651, and outputs the generated display information to the display-processing unit 65.

The wireless-LAN interface 62 is an interface circuit used for connecting to the LAN 100 via the wireless-LAN access point 20a and/or the wireless-LAN access point 20b. The wireless-LAN interface 62 demodulates a reception signal transmitted from the wireless-LAN access point 20a and/or the wireless-LAN access point 20b, transmits the demodulated signal to the control unit 61, modulates an output signal transmitted from the control unit 61, and transmits the modulated signal to the wireless-LAN access point 20a and/or the wireless-LAN access point 20b in a wireless manner.

The short-range wireless interface 63 includes a wireless-IC chip configured to perform communications according to the electromagnetic-induction communication scheme, an antenna used for transmitting and/or receiving a signal, and so forth. The short-range wireless interface 63 operates by generating power on the basis of a radio wave transmitted from the electronic-conference terminal 10a and/or the electronic-conference terminal 10b, and the reader-and-writer (the short-range wireless interfaces 16 and 42) provided in the expansion box 40, so as to transmit and/or receive a signal to/from the electronic-conference terminal 10a and/or the electronic-conference terminal 10b, and/or the expansion box 40.

The speech-processing unit 64 converts a speech signal transmitted from the microphone 641 into a digital signal, encodes the digital signal into a signal in a predetermined format, and outputs the encoded signal to the control unit 61. Further, the speech-processing unit 64 decodes and converts the speech signal transmitted from the control unit 61 into an analog signal and outputs the analog signal to the speaker 642 so that the speaker 642 reproduces the signal. The display-processing unit 65 generates a video signal on the basis of display information generated by the control unit 61 and outputs the video signal to the monitor 651 including a liquid-crystal display (LCD) so that the monitor 651 produces an image of the video signal. The input unit 66 includes an input key or the like and outputs the control signal corresponding to an operation performed by the user to the control unit 61.

Further, according to the above-described embodiment, the electromagnetic-induction communication scheme is used, as the short-range wireless communication scheme used for performing direct communications among the electronic-conference terminals 10a and 10b, the expansion box 40, and the mobile terminals 60a and 60b. However, Bluetooth, an infrared communication scheme, and so forth may be used, as the short-range wireless communication scheme. Further, a communication method using a relatively short cable may be used in place of the wireless-communication method. For example, a communication method achieved on the basis of Universal Serial Bus (USB), Institute of Electrical and Electronic Engineers (IEEE) 1394, and so forth may be used.

Next, operations of the above-described communication system will be described, the operations being performed for sharing the data files stored in the PC 30 among devices. FIG. 5 is a diagram schematically showing the entire operations performed for sharing the data files.

FIG. 5 schematically shows example operations performed for transmitting the data files stored in the PC 30, the data files including data on an image, a text, a drawing, and so forth, to the electronic-conference terminal 10b so that the electronic-conference terminal 10b reproduces the above-described data while an electronic conference is held between the electronic-conference terminals 10a and 10b. In FIG. 5, the electronic-conference terminal 10a, and the wireless-LAN access points 20a and 20b are omitted for the sake of clarity.

In the above-described communication system, the data files stored in the devices of the system can be shared by performing easy operations by using the mobile terminals 60a and 60b of conferees in each conference rooms. First, for making the data files stored in the PC 30 sharable among the devices, the user on the electronic-conference-terminal-10a side brings the mobile terminal 60a near to the expansion box 40 connected to the PC 30 and makes the expansion box 40 detect the mobile terminal 60a (step S11). The connection-control unit 41 of the expansion box 40 detects the mobile terminal 60a via the short-range wireless interface 42, and authenticates the mobile terminal 60a. When the connection-control unit 41 succeeds in the authentication, it becomes possible to perform communications between the expansion box 40 and the mobile terminal 60a via the LAN 100.

Here, the mobile terminal 60a accesses the expansion box 40 via the LAN 100 through the wireless-LAN access point 20a and transmits a control command, so as to make a predetermined data file of the data files stored in the PC 30 sharable among devices. According to the control command, the expansion box 40 controls the PC 30 so that the predetermined data file is uploaded to the file server 50 and stored, as an object to be shared (step S12). Then, the expansion box 40 transmits file-sharing information indicating that the predetermined data file becomes sharable to the mobile terminal 60a via the LAN 100 (step S13). The file-sharing information includes location information including the uniform resource locator (URL) of the predetermined data file stored in the file server 50, the attribute information of the predetermined data file, and so forth. By acquiring the file-sharing information, the mobile terminal 60a can make other devices use the predetermined data file and/or use the predetermined data file.

Further, for uploading the data file stored in the PC 30 to the file server 50 after the mobile terminal 60a is detected by the expansion box 40, the mobile terminal 60a transmits a control command according to an operation input transmitted from the user, and the expansion box 40 makes the PC 30 upload the data file according to the control command. For example, when the icon of the data file is selected on the monitor 34a connected to the PC 30, and the control command is transmitted from the mobile terminal 60a, operations adapted to make the data file sharable (steps S12 and S13) are performed. On the other hand, the above-described operations (steps S12 and S13) may be started automatically when the mobile terminal 60a is detected by the expansion box 40 (step S11) after the data file is selected in the above-described manner. In that case, the control command and the file-sharing information may be transferred via the short-range wireless interfaces 42 and 64 of the devices.

Next, an IP-telephone conversation is started between the mobile terminals 60a and 60b, so as to make the electronic-conference terminal 10b use the data file uploaded to the file server 50, and the file-sharing information is transmitted from the mobile terminal 60a to the mobile terminal 60b by performing steps of message transmission executed on the basis of VoIP (step S14). The user on the electronic-conference-terminal-10b side brings the mobile terminal 60b near to the electronic-conference terminal 10b and makes the electronic-conference terminal 10b detect the mobile terminal 60b (step S15). The connection-control unit 14 of the electronic-conference terminal 10b detects the mobile terminal 60b via the short-range wireless interface 16, and authenticates the mobile terminal 60b. When the connection-control unit 14 succeeds in the authentication, it becomes possible to perform communications between the electronic-conference terminal 10b and the mobile terminal 60b via the LAN 100.

Next, the mobile terminal 60b transmits the file-sharing information and the control command to the electronic-conference terminal 10b via the LAN 100 according to an operation input transmitted from the user and makes a request of the electronic-conference terminal 10b to download the data file corresponding to the file-sharing information from the file server 50 (step S16). Upon receiving the request, the electronic-conference terminal 10b downloads the corresponding data file from the file server 50 according to the file-sharing information (step S17). Subsequently, it becomes possible to use the corresponding data file in the electronic-conference terminal 10b.

While the above-described operations adapted to download the data file are performed, processing procedures performed at steps S15 and S16 may include the following processing. Namely, after the mobile terminal 60a is detected by the electronic-conference terminal 10b, the mobile terminal 60b may automatically transmit the file-sharing information to the electronic-conference terminal 10b and make a request for downloading the data file. In that case, the control command and/or the file-sharing information may be transferred through the short-range wireless interfaces 16 and 63 of the devices.

The above-described processing procedures performed at steps S11 to S17 are basic operation steps performed for sharing the data files. At steps S11 to S17, a data file which is made sharable is stored and registered with the file server 50 and the file-sharing information including information about the location of the data file is transmitted to a device which uses the data file via the mobile terminal 60a and/or the mobile terminal 60b. That is to say, the file-sharing information functions, as a ticket to the usage of the data file registered with the file server 50. Since the file-sharing information is transferred through the network, each of the devices on the network is informed of the location of the data file so that the devices can access and use the data file.

Subsequently, even though the user does not perform operations, so as to set information indicating the original location of the data file, the device which uses the data file can acquire the data file. Further, the file-sharing information does not include the corresponding data file and is generated, as data with a relatively small capacity. Therefore, the file-sharing information can be transferred for performing communication service with a small transmission band such as IP-telephone message-transmission service. Further, by introducing the operations performed, so as to make a data file sharable, and the operations including bringing the mobile terminal 60a and/or the mobile terminal 60b near to the device which uses the data file so that the device detects the mobile terminal, so as to make the device download the data file, it becomes possible to perform the above-described operations by performing an intuitive operation.

Further, according to the example operations, the data file stored in the PC 30 is used by the electronic-conference terminal 10b. However, the data file may be used by the electronic-conference terminal 10a. In that case, the mobile terminal 60a which had acquired the file-sharing information is brought near to the electronic-conference terminal 10a so that the electronic-conference terminal 10a detects the mobile terminal 60a according to the short-range wireless communication scheme. After the mobile terminal 60a is correctly authenticated by the electronic-conference terminal 10a, the file-sharing information is transmitted from the mobile terminal 60a to the electronic-conference terminal 10a, as is the case with step S16, and a request for downloading the data file is made. Subsequently, the electronic-conference terminal 10a can access the data file stored in the file server 50 according to the file-sharing information, and download and use the data file. Further, the mobile terminal 60a and/or the mobile terminal 60b may download and use the corresponding data file according to the file-sharing information.

The file-sharing information may include various types of attribute information of the sharable data file in addition to the location information of the sharable data file so that the mobile terminal 60a and/or the mobile terminal 60b can perform processing according to the attribute information. In the following embodiment, when the sharable data file includes the image data, a thumbnail of the image data is prepared and the attribute information and location information of the thumbnail is included in the file-sharing information. Subsequently, the mobile terminal 60a can receive data on the thumbnail appropriate for the mobile terminal 60a and produce an image of the data.

FIG. 6 shows the sequence of processing procedures performed, so as to make the data file sharable. In the initial state, the mobile terminal 60a is brought near to the expansion box 40, and the expansion box detects the mobile terminal 60a according to the short-range wireless communication scheme. Subsequently, authentication is performed between the mobile terminal 60a and the expansion box 40. Namely, the identification IDs, IP addresses, and so forth of the mobile terminal 60a and the expansion box 40 are exchanged. When the authentication is succeeded, communications can be performed via the LAN 100 by using the exchanged information.

When the communications are established, the mobile terminal 60a transmits a control command used for making a desired data file stored in the PC 30 sharable among devices to the expansion box 40 via the LAN 100 (step S21). In the above-described, an application program is executed in the PC 30 so that the PC 30 can operate in conjunction with the expansion box 40. Due to the processing of the program, the icon of the desired data file stored in the PC 30 is produced. When the control command is transmitted according to the operation of the mobile terminal 60a while the icon is produced, a request for making the data file sharable can be fulfilled, the data file corresponding to the produced icon.

Upon receiving the request, the expansion box 40 controls the PC 30 via the communication interface 43 so that the PC 30 uploads the corresponding data file to the file server 50 (step S22). Upon receiving the data file, the file server 50 generates the sharing-management region corresponding to the request in a recording medium, and stores and registers the data file with the region (step S23). Next, the file server 50 identifies the attribute of the registered data file. When the data file includes image data, the file server 50 generates a data file including a plurality of thumbnails of different resolutions (step S24). Then, the file server 50 generates file-sharing information including the location information (URL) of the original data file, the location information (URL) of each of the thumbnails, the attribute information (resolution, data size, and so forth) of each of the thumbnails, and transmits the file-sharing information to the expansion box 40 (step S25). When video data is registered with the sharing-management region, the file server 50 may generate data on a thumbnail at a predetermined position, such as the first image of the video data.

Upon receiving the file-sharing information, the expansion box 40 transmits a command response and the file-sharing information to the mobile terminal 60a via the LAN 100 (step S26). The mobile terminal 60a refers to the attribute information of the thumbnail, the attribute information being included in the file-sharing information, selects the thumbnail adequate for the capacity of the mobile terminal 60a, accesses the file server 50 on the basis of the location information of the thumbnail, and makes a request for transmission of the thumbnail corresponding to the selected thumbnail (step S27). At step S27, the adequate thumbnail is selected according to the production capacity of the monitor 651, the processing capacity for the production, the memory capacity, and so forth of the mobile terminal 60a.

The file server 50 extracts the data file including the thumbnail for which the mobile terminal 60a makes the request and transmits the extracted data file to the mobile terminal 60a (step S28). Upon receiving the data file including the thumbnail, the mobile terminal 60a produces the thumbnail on the monitor 651 (step S29).

Subsequently, the user of the mobile terminal 60a can confirm the contents of the sharable data file through the monitor 651, as if the original data file had been stored in the mobile terminal 60a. After that, when the user makes a request for downloading the data file to the other device, the user can perform the request operation, as if the original data file would be transferred from the mobile terminal 60a to the other device.

Further, the thumbnail appropriate for the production capacity, the memory capacity, and so forth of the mobile terminal 60a can be selected and received on the basis of the attribute information of the thumbnail, the attribute information being included in the file-sharing information. Therefore, even though the screen of the monitor 651 of the mobile terminal 60a is reduced in size, so as not to reduce the portability, and/or the processing capacity and memory capacity of the mobile terminal 60a are reduced, so as to reduce the manufacturing cost, the operation sensation of the user can be increased without increasing the size and cost of the mobile terminal 60a.

Further, in the above-described embodiment, the LAN interface 44 is provided in the expansion box 40 connected to the PC 30 so that communications are established between the expansion box 40 and the mobile terminal 60a via the LAN interface 44 and the data files stored in the PC 30 are shared therebetween. Otherwise, the expansion box 40 and the mobile terminal 60a may communicate with each other directly according to the short-range wireless communication scheme so that if the communications are performed via the LAN 100, the expansion box 40 and the mobile terminal 60a may communicate with each other via the LAN interface 36 of the PC 30. In that case, when the expansion box 40 detects the mobile terminal 60a according to the short-range wireless communication scheme at step S11 shown in FIG. 5, the expansion box 40 informs the mobile terminal 60a of the IP address of the PC 30. Subsequently, the mobile terminal 60a can communicate with the PC 30 and the expansion box 40 via the LAN 100 according to the above-described IP address. Further, communications are performed between the file server 50 and the PC 30 via the LAN interface 36 of the PC 30, the communications being established, so as to upload a data file, transmit a command response, and so forth.

As has been described, the file-sharing information transmitted to the mobile terminal 60a is transferred to the other device such as the electronic-conference terminal 10b, so as to permit the use of the data file stored in the file server 50. For example, however, when the mobile terminal 60a uses the sharable data file, the file-sharing information may include not only the location information but also the attribute information so that the mobile terminal 60a can perform the processing corresponding to the attribute information.

For example, when a program executed by the mobile terminal 60a is updated by using a firmware program stored in the PC 30, the PC 30 which had received a control command transmitted from the control terminal 60a registers a plurality of firmware programs with different OSes and software versions with the file server 50 for the firmware program subjected to the updating. Then, the location information and attribute information (identification information of the OSes and versions, for example) of each of the firmware programs are included in the file-sharing information and transmitted to the mobile terminal 60a via the PC 30. Therefore, the mobile terminal 60a can download the firmware program adequate for the mobile terminal 60a from the file server 50 on the basis of the attribute information. Subsequently, it becomes possible to update the program correctly and automatically, even though the user of the mobile terminal 60a does not specify the location where the firmware program required for the updating is installed.

Further, the file-sharing information including the attribute information may be transmitted from the mobile terminal 60a to the other device (the electronic-conference terminal 10a and/or the electronic-conference terminal lob) so that the destination device can receive an adequate firmware program transmitted from the file server 50 on the basis of the attribute information.

It should be understood by those skilled in the art that various modifications, combinations, sub-combinations and alterations may occur depending on design requirements and other factors insofar as they are within the scope of the appended claims or the equivalents thereof.

What is claimed is:

1. A data-sharing system configured to share a data file among a plurality of devices, the data-sharing system comprising:
   a plurality of information-processing devices which can store at least one data file;
   a file server which manages the at least one data file; and
   a mobile terminal which controls an operation performed, to share the at least one data file stored in one of the plurality of information-processing devices,
   wherein the file server includes
      file-management means for receiving and storing the at least one data file stored in the one of the plurality of information-processing devices, when it is requested that the at least one data file be registered, as an object to be used by an other of the plurality of information-processing devices;
      shared-information transmission means for transmitting file-sharing information including location information and attribute information of the at least one data file stored by the file-management means; and
      first file-transmission means for returning the at least one data file stored by the file-management means upon receiving an instruction to select the at least one data file stored by the file-management means, wherein
   each of the plurality of information-processing devices includes
      second file-transmission means for transmitting the at least one data file, which is stored in the respective information-processing device to the file server upon receiving request information transmitted from the mobile terminal, the request information indicating that it is requested that the at least one data file stored in the respective information-processing device be registered, as the object to be used by the other of the plurality of information-processing devices; and
      shared-information transfer means for transferring the file-sharing information to the mobile terminal, the file-sharing information being transmitted from the file server, after the second file-transmission means transmits the at least one data file to the file server, and
   wherein
   the mobile terminal includes
      registration-request means for making a request of the one of the plurality of information-processing devices to register the at least one data file stored in the one of the plurality of information-processing devices, as the object to be used by the other of the plurality of information-processing devices; and
      transmission-request means for selecting the at least one data file to be received on the basis of the attribute information included in the file-sharing information transmitted from the one of the plurality of information-processing devices, for accessing the file server on the basis of the location information corresponding to the selected at least one data file, and for making a request of the file server to transmit the selected at least one data file.

2. The data-sharing system according to claim 1, wherein the file server further includes reduced-image-data generation means, operated when the at least one data file includes image data that is transmitted from the one of the plurality of information-processing devices for generating a plurality of reduced-image-data items of different resolutions on the basis of the image data and for storing the plurality of reduced-image-data items in the file-management means,
   wherein the mobile terminal further includes image-reproduction means for reproducing and showing the plurality of reduced-image-data items,
   wherein the shared-information transmission means transmits the location information of the registered at least one data file, and location information and attribute information of each of the plurality of reduced-image-data items corresponding to the registered at least one data file, as the file-sharing information,
   wherein the transmission-request means of the mobile terminal selects at least one of the plurality of reduced-image-data items, to receive the selected at least one of the plurality of reduced-image-data items, on the basis of the attribute information of the at least one of the plurality of reduced-image-data items included in the file-sharing information transmitted to the transmission-request means, accesses the file server on the basis of the location information corresponding to the selected at least one of the plurality of reduced-image-data items, and makes a request of the file server to return the selected at least one of the plurality of reduced-image-data items.

3. The data-sharing system according to claim 2, wherein the shared-information transmission means adds at least one of information about a resolution and information about a size of each of the plurality of reduced-image data items to the file-sharing information, as the attribute information of each of the plurality of reduced-image data items.

4. The data-sharing system according to claim 2, wherein the transmission-request means selects the at least one of the plurality of reduced-image-data items according to at least one of information about a production capacity of the image-reproduction means and information about a data-storage capacity of the mobile terminal on the basis of the attribute information of the plurality of reduced-image data items included in the file-sharing information transmitted to the transmission-request means.

5. The data-sharing system according to claim 1, wherein the mobile terminal further includes first request means for transmitting the file-sharing information to the other of the plurality of information-processing devices, to make a request of the other of the plurality of information-processing devices to receive the at least one data file transmitted from the file server, and the information-processing device further includes second request means for accessing the file server, to make a request of the file server to transmit the at least one data file on the basis of the location information included in the file-sharing information transmitted from the mobile terminal.

6. The data-sharing system according to claim 5, wherein the file-management means stores a plurality of data files corresponding to one another, the data files being different from one another in operating systems and versions thereof, and the shared-information transmission means adds identification information to the file-sharing information, as the attribute information of each of the plurality of data files, the identification information identifying at least one of a respective operating system and a version that correspond to each of the plurality of data files stored by the file-management means.

7. The data-sharing system according to Claim 1, wherein each of the information-processing devices further includes:
   detection means for detecting the mobile terminal according to a short-range communication scheme; and
   authentication means for performing an authentication for the mobile terminal detected by the detection means, and for allowing for communicating with the mobile terminal, when the mobile terminal is authenticated.

8. A mobile terminal which controls an operation performed, to share at least one data file among a plurality of devices, the mobile terminal comprising:
   registration-request means for making a request of one of a plurality of information-processing devices to transmit at least one predetermined data file stored in the one of the plurality of information-processing devices to a file server so that the at least one predetermined data file is registered with the file server, as an object to be used by an other of the plurality of information-processing devices; and
   transmission-request for receiving file-sharing information including location information and attribute information of the registered at least one predetermined data file, the file-sharing information being transmitted from the file server via the one of the plurality of information-processing devices, for selecting the at least one predetermined data file on the basis of the attribute information included in the transmitted file-sharing information, for accessing the file server on the basis of the location information, and for making a request to the file server to transmit the selected at least one predetermined data file.

9. A data-sharing method adapted to share a data file among a plurality of devices, the data-sharing method comprising:
   transmitting the data file stored in one of a plurality of information-processing devices to a file server by using the one of the plurality of information-processing devices, when a mobile terminal configured to control a data-file-sharing operation makes a request of the one of the plurality of information-processing devices to register the data file, as an object to be used by an other of the plurality of information-processing devices;
   storing the data file in a management region, the storing being performed by the file server;
   transmitting file-sharing information including location information and attribute information of the data file stored in the management region, by the file server;
   transferring the file-sharing information from the one of the plurality of information-processing devices to the mobile terminal after the one of the plurality of the information-processing devices receives the file-sharing information, the one of the plurality of information-processing devices functioning as a transmission source of the data file stored in the management region;
   receiving the file-sharing information, selecting the data file for a reception on the basis of the attribute information included in the file-sharing information, accessing the file server on the basis of the location information and making a request of the file server to transmit the data file by using the mobile terminal; and
   transmitting the data file for which the mobile terminal made the request from the file server to the mobile terminal, after the file server reads the data file from the management region, by the file server.

10. A data-sharing system configured to share a data file among a plurality of devices, the data-sharing system comprising:
   a plurality of information-processing devices which can store at least one data file;
   a file server which manages the at least one data file; and
   a mobile terminal which controls an operation performed, to share the at least one data file stored in one of the plurality of information-processing devices, wherein
   the file server includes
      a file-management unit configured to receive and to store the at least one data file stored in the one of the plurality of information-processing devices, when it is requested that the at least one data file be registered, as an object to be used by an other of the plurality of information-processing devices;
      a shared-information transmission unit configured to transmit file-sharing information including location information and attribute information of the at least one data file stored by the file-management unit; and
      a first file-transmission unit configured to return the at least one data file stored by the file-management unit upon receiving an instruction to select the at least one data file stored by the file-management unit, wherein
   each of the information-processing devices includes
      a second file-transmission unit which transmits the at least one data file stored in the one of the plurality of information-processing devices to the file server upon receiving request information transmitted from the mobile terminal, the request information indicating that it is requested that the at least one data file stored in the one of the plurality of information-processing devices be registered, as the object to be used by the other of the plurality of information-processing devices; and
      a shared-information transfer unit which transfers the file-sharing information to the mobile terminal, the file-sharing information being transmitted from the file server after the second file-transmission unit of the one of the plurality of information-processing devices transmits the at least one data file to the file server, and wherein
   the mobile terminal includes
      a registration-request unit which makes a request of the one of the plurality of the information-processing devices to register the at least one data file stored in the one of the plurality of information-processing devices, as the object to be used by the other of the plurality of information-processing devices; and a transmission-request unit configured to select the at least one data file on the basis of the attribute information included in the file-sharing information transmitted from the one of the plurality of information-processing devices, to access the file server on the basis of the location information, and to make a request of the file server to transmit the selected at least one data file.

11. A mobile terminal which controls an operation performed, to share at least one data file among a plurality of devices, the mobile terminal comprising:

a registration-request unit which makes a request of one of a plurality of information-processing devices to transmit at least one predetermined data file stored in the one of the plurality of information-processing devices to a file server so that the at least one predetermined data file is registered with the file server, as an object to be used by an other of the plurality of information-processing devices; and a transmission-request unit configured to receive file-sharing information including location information and attribute information of the at least one registered predetermined data file, the file-sharing information being transmitted from the file server via the one of the plurality of information-processing devices, to select the at least one predetermined data file on the basis of the attribute information included in the transmitted file-sharing information, to access the file server on the basis of the location information, and to make a request of the file server to transmit the selected at least one predetermined data file.

* * * * *